United States Patent
Mitchel et al.

(10) Patent No.: US 8,543,968 B2
(45) Date of Patent: Sep. 24, 2013

(54) SYSTEM AND METHOD FOR CREATING, MANAGING, DEPLOYING AND ARCHIVING DATA-INTENSIVE APPLICATIONS AND PROJECTS

(75) Inventors: Jules T. Mitchel, New York, NY (US); Andrew C. Moncrieffe, Great Neck, NY (US); Dong-Joon You, Monteville, NJ (US)

(73) Assignee: Target Health, Inc., New York, NY (US)

( * ) Notice: Subject to any disclaimer, the term of this patent is extended or adjusted under 35 U.S.C. 154(b) by 1832 days.

(21) Appl. No.: 11/561,152

(22) Filed: Nov. 17, 2006

(65) Prior Publication Data

US 2007/0124346 A1    May 31, 2007

Related U.S. Application Data

(60) Provisional application No. 60/737,572, filed on Nov. 17, 2005.

(51) Int. Cl.
*G06F 9/44* (2006.01)

(52) U.S. Cl.
USPC .......................................... 717/101; 717/120

(58) Field of Classification Search
USPC .......................................................... 717/101
See application file for complete search history.

(56) References Cited

U.S. PATENT DOCUMENTS

| | | | | |
|---|---|---|---|---|
| 6,556,999 | B1 * | 4/2003 | Kloos et al. ............................. | 1/1 |
| 6,687,190 | B2 * | 2/2004 | Momich et al. .................. | 368/10 |
| 7,870,006 | B2 * | 1/2011 | Tkaczyk et al. ................... | 705/2 |
| 8,041,581 | B2 * | 10/2011 | Mitchel et al. ..................... | 705/2 |
| 2002/0059030 | A1 * | 5/2002 | Otworth et al. .................. | 702/19 |
| 2002/0064095 | A1 * | 5/2002 | Momich et al. .................. | 368/10 |
| 2003/0208378 | A1 * | 11/2003 | Thangaraj et al. ................. | 705/2 |
| 2003/0208448 | A1 * | 11/2003 | Perry et al. ....................... | 705/64 |
| 2004/0078216 | A1 * | 4/2004 | Toto .................................. | 705/2 |
| 2004/0083216 | A1 * | 4/2004 | Kozam et al. ................... | 707/10 |
| 2004/0187140 | A1 * | 9/2004 | Aigner et al. .................. | 719/328 |
| 2004/0243439 | A1 * | 12/2004 | Huggard et al. ................... | 705/2 |
| 2004/0249664 | A1 * | 12/2004 | Broverman et al. .............. | 705/2 |
| 2005/0102158 | A1 * | 5/2005 | Maeda ............................... | 705/2 |
| 2005/0251501 | A1 * | 11/2005 | Phillips et al. ..................... | 707/2 |
| 2005/0251527 | A1 * | 11/2005 | Phillips et al. ................ | 707/101 |
| 2005/0288967 | A1 * | 12/2005 | Zammit ............................ | 705/3 |

(Continued)

OTHER PUBLICATIONS

Jacob et al., "Framework for a Virtual Center to Support Multi-center Clinical Trials in Cardiology"0 2000 IEEE, retrieved from <http://ieeexplore.ieee.org/stamp.jsp?tp=&arnumber=898589> total pages: 4.*

*Primary Examiner* — Don Wong
*Assistant Examiner* — Marina Lee
(74) *Attorney, Agent, or Firm* — Kohn & Associates PLLC (57) ABSTRACT

According to the present invention, there is provided an integrated application design, management, and deployment method, including the steps of: defining and displaying the navigational and data-related parameters of an application; controlling the overall functionality and operation of the process; initiating and running an application; and storing and referencing all data associated with an application. The present invention also provides an integrated electronic application design, management, and deployment system, including a design mechanism for intuitively defining and displaying the navigational and data-related parameters of an application; a management mechanism for controlling the overall functionality and operation of the system; a deployment mechanism for initiating and running an electronic application; and an archiving mechanism for storing and referencing all data associated with an electronic application.

26 Claims, 9 Drawing Sheets

(56) References Cited

U.S. PATENT DOCUMENTS

| | | | |
|---|---|---|---|
| 2006/0064440 A1* | 3/2006 | Perry | 707/200 |
| 2006/0174210 A1* | 8/2006 | Richards et al. | 715/769 |
| 2007/0067299 A1* | 3/2007 | Kozam et al. | 707/10 |
| 2007/0124346 A1* | 5/2007 | Mitchel et al. | 707/204 |
| 2007/0265881 A1* | 11/2007 | El Eman et al. | 705/3 |

* cited by examiner

SYSTEM AND METHOD FOR CREATING, MANAGING, DEPLOYING AND ARCHIVING DATA-INTENSIVE APPLICATIONS AND PROJECTS

CROSS-REFERENCE TO RELATED APPLICATIONS

This application claims the benefit of priority under 35 U.S.C. Section 119(e) of U.S. Provisional Patent Application No. 60/737,572, filed Nov. 17, 2005, which is incorporated herein by reference.

BACKGROUND OF THE INVENTION

1. Field of the Invention

The invention generally relates to the field of integrated creation, documentation, definition, implementation, maintenance, deployment, and archival of computer applications, e.g. desktop, server and/or web-based applications and/or projects. Specifically, the invention relates to the areas of defining and designing navigational and data related parameters of data-intensive/data-centric project and/or application, managing operations and deployment of the applications, and dynamically generating the components necessary to embody the projects and/or applications.

2. Description of the Related Art

Throughout the history of data collection and analysis, costs, efficiency, and accuracy have been major concerns of those conducting data collection initiatives, applications, or projects. It is often difficult to efficiently conduct research and/or data-collection across multiple locations, especially if the locations are significantly distant. Additionally, the accurate processing of the collected data is often difficult to ensure, primarily because of the large number of people who input information (depending on the setting, type of research and/or project, and any other such settings known to those of skill in the art), lending to the likelihood of human error. Furthermore, even when all the necessary data has been collected, many users do not posses the necessary programming and computer skills required to properly analyze and manage the data.

As we enter the 21st century, the present invention can be applied to form to a new, integrated approach in data-collection and management utilizing web or application-based data collection, retrieval and management. Using this integrated solution offers a convenient, cost effective medium to streamline all areas and aspects of data collection and project/application management.

U.S. Pat. No. 6,496,827 to Kozam, et al., generally discloses the collection of clinical trial data over the internet. However, Kozam specifically requires two data checks—one occurring on a remote-site computer, and a second occurring on a central computer. The present invention requires no such checking, as the user is empowered to define how and where the data is checked. Furthermore, Kozam is specifically limited to the field of clinical trials, while the present invention is broadly applicable to many fields beyond the clinical trial setting. Finally, Kozam fails to disclose, in any way, the seamlessly integrated design, management, deployment, and archiving functionalities of the present invention.

US Patent Application Publication No. 2006/0174210 to Richards, et al., generally discloses a system for electronically capturing and managing data for clinical trials. However, Richards, like Kozam, is specifically restricted to the field of clinical trials, while the present invention is suited for applications beyond the limited clinical trial setting. Furthermore, Richards fails to disclose, in any way, the seamlessly integrated design, management, deployment, and archiving functionalities of the present invention.

SUMMARY OF THE INVENTION

According to the present invention, there is provided an integrated application design, management, and deployment method, including the steps of: defining and displaying the navigational and data-related parameters of an application; controlling the overall functionality and operation of the process; initiating and running an application; and storing and referencing all data associated with an application. The present invention also provides an integrated electronic application design, management, and deployment system, including a design mechanism for intuitively defining and displaying the navigational and data-related parameters of an application; a management mechanism for controlling the overall functionality and operation of the system; a deployment mechanism for initiating and running an electronic application; and an archiving mechanism for storing and referencing all data associated with an electronic application. Preferably, the present invention is directed towards a system, software program, and method for designing and defining the parameters of an application, configuring and managing the operation of an application, and deploying and archiving an application to obtain the desired information and results.

DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Generally, the present invention provides an integrated method and computer system comprising three main components: a studio module, a console module, and a runtime module. The combination of these components provides for the creation, deployment and archiving of user applications, and/or websites, for data collection, data management, and data analysis. These applications can operate locally in a standalone setting, and/or can be configured to operate in a network setting, involving client-server communication and interaction. Generally, the studio component allows the user to define the navigational elements and aspects of the overall workflow and data related parameters of a specific application and/or a website, and/or a series of websites. The console component manages the operation, deployment and archiving of applications and/or websites used in the system. The runtime module renders and generates the user interface, including, but not limited to menus, forms and elements, screens, and reports for use by the system's end-user.

The present invention is utilized for numerous reasons and in numerous settings. The present invention relates to various processes that include, but are not limited to, navigation and interface design and definition, data input, verification, and storage, application management and deployment, application rendering and generation, application archiving, and any other process that relates to the design, creation, definition, management, deployment, archiving, and rendering of data-intensive/data-centric applications and/or projects. Preferably, though, the present invention is well suited for use with regard to an integrated design studio, project management console, and deployment runtime module, which together encompass navigational design, project management, and application rendering.

The preferred embodiment of the present invention is for use in the data-collection/management field, although the present invention is operable in fields including, but not limited to, government settings, medical settings, clinical settings, academic settings, and any other fields needing the integrated design, management, and deployment systems and methods described herein. In particular, the present invention is well suited for use in fields involving large amounts of data collected in distant locations, and operated by users who may or may not have prior programming experience.

The present invention generally operates through the use of a software program that allows for the integrated functionality as described herein.

The present invention is accessible through any device possessing the appropriate hardware capable of operating the system of the present invention. Appropriate devices include, but are not limited to, personal computers (PC's), portable computers, hand-held devices, wireless devices, web-based technology systems, touch screen devices, typing devices, and any similar electronic devices.

The user interacts with the system using a graphical user interface (GUI), which configures and controls the operation of the system. Entry of information occurs through input devices including, but not limited to, pointing devices, keyboards, electronic pens together with handwriting recognition software, mouse devices, touch-screen devices, scanners, and any other similar electronic input devices known to those of skill in the art.

The present invention works in unison with other networked devices, and also works independently on a single device, as described herein. Thus, wired or wireless transmission from the device to a common server is possible. The present invention allows for simultaneous, multiple users.

The present invention is compatible with all standard networks, such as Novell Netware, Unix NFS, Microsoft® Windows (SMB and CIFS), all major operating systems (e.g., Microsoft® Windows XP, Server 2003, Apple® OS X, Linux), and all major web browsers (e.g., Microsoft® Internet Explorer, Mozilla Firefox).

The software program is accessible through communication systems including, but not limited to, the Internet, Intranet, Extranet, and any other similar digital network mechanism know to those of skill in the art. Additionally, the software can be interfaced and integrated with currently existing software programs involving digital data such as Microsoft Office Suite, SAS, and other such business software programs, as well as existing electronic document storage systems, including databases.

Studio

Figure 1:
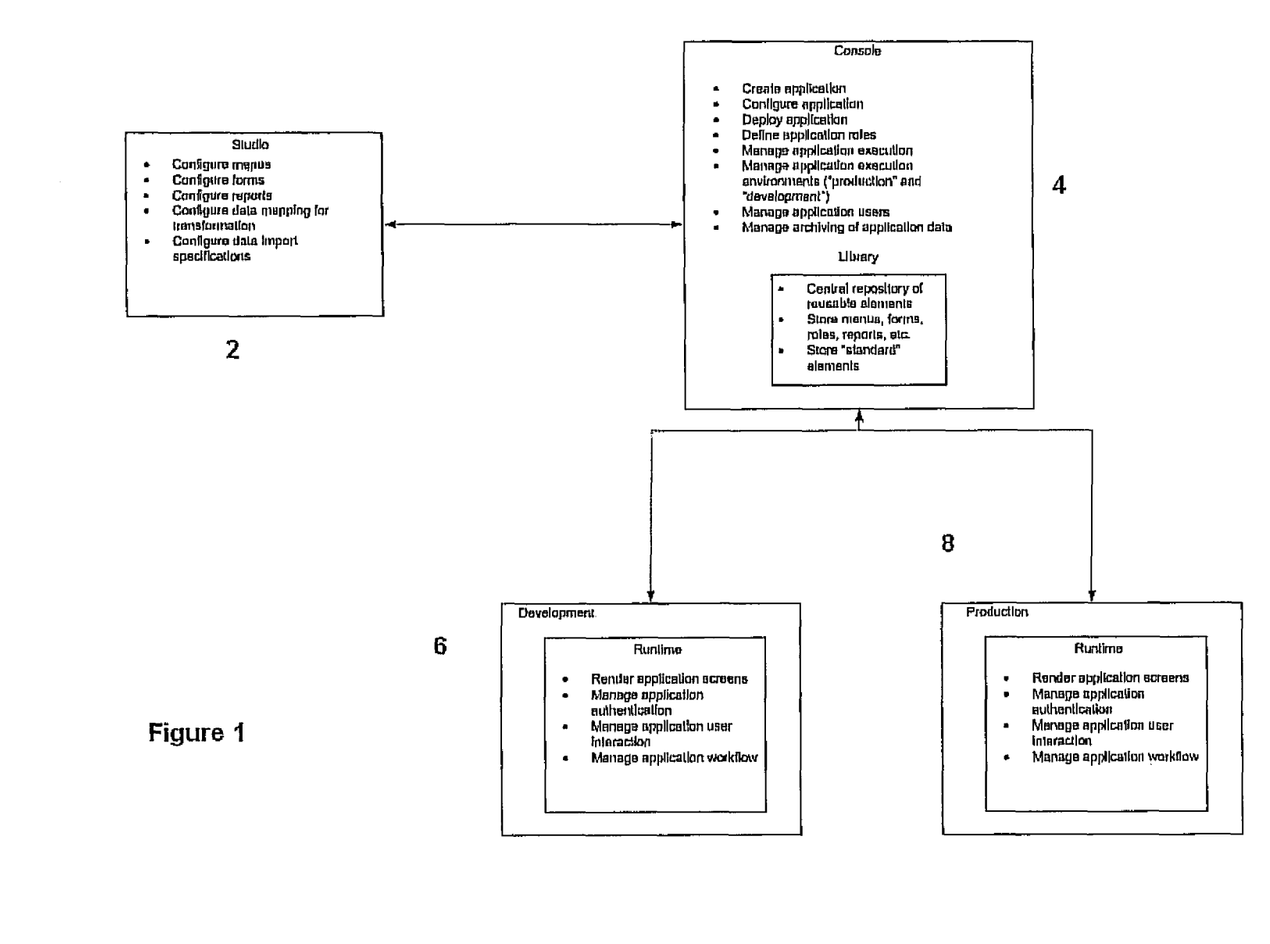
FIG. 1 represents a conceptual overview diagram of the design and management system.

FIG. 1 represents a conceptual overview of the design and management system. The studio application module (2) allows the user to design, define, and configure the navigational and data related elements of the system, as well as the overall operation and sequence of the application/website being designed.

The studio application module can be configured by the user to function either locally, as a standalone application, or in a connected setting, where its functionality is integrated with the operation of the console (4) and runtime (6), (8) system modules. In both standalone operation, as well as in a connected setting, the studio module allows the user to design and define aspects of a project including forms, menu structures and operation, data input parameters, data validation parameters, data parsing parameters, as well as specific display and documentation properties associated with data that has already been, or has yet to be, input, imported, or stored.

Figure 2:
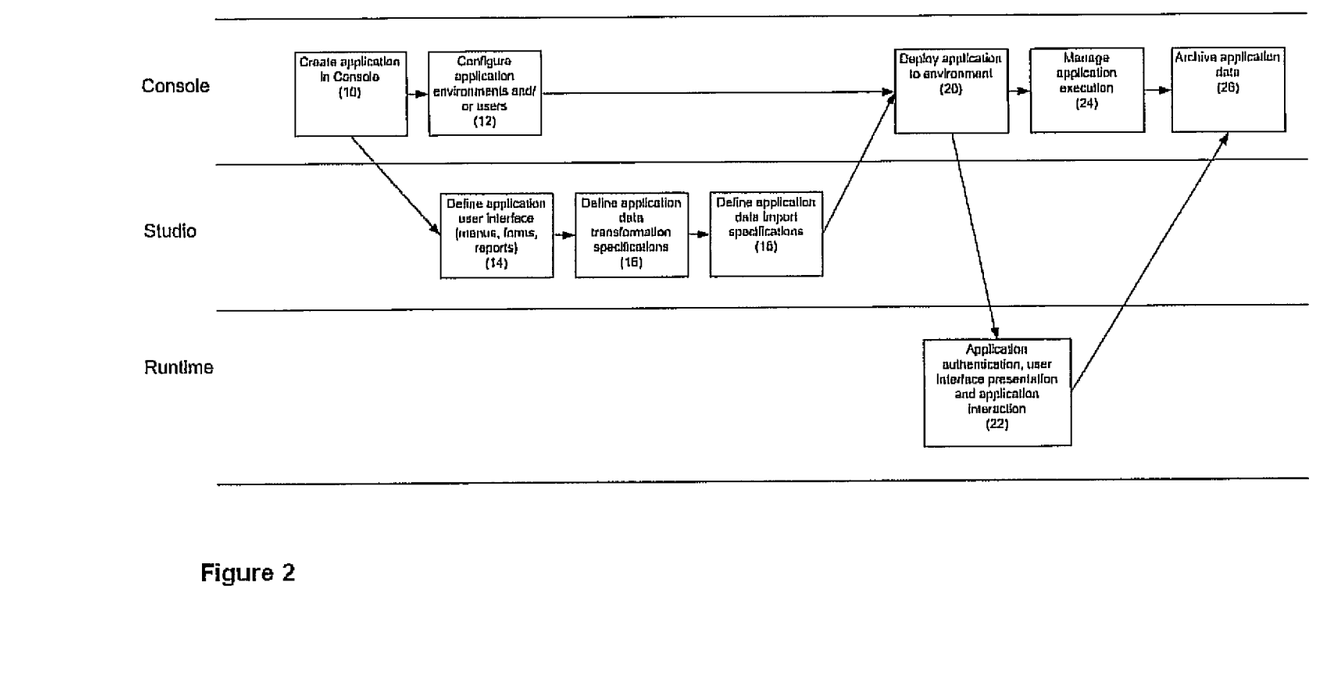
FIG. 2 represents a workflow diagram that defines the preferred embodiment of the present invention.

FIG. 2 represents a workflow diagram which defines the preferred embodiment of the present invention. Generally, when the studio module is operating in a connected environment, integrated with the console and runtime modules, the user initially creates an application in the console module (10). The user then uses the studio module to define the application and/or website interface specifications (14) and data specifications (16), (18).

The studio module allows the user to design and configure an efficient and user-friendly GUI for a stand-alone application, integrated application, website (14), or any other such applications known to those of skill in the art. The studio module generally organizes menu hierarchies and data input forms, allowing the user to define fully and comprehensively, the look, feel, and operation of their data collection, data management, and data analysis application. For example, the user can define what fields should be displayed in a data-entry form, how and where these fields should be displayed, what format the range of acceptable responses should take on (e.g., radio buttons, pull down menu, text input, and any other such tools known to those of skill in the art), the sequencing of the stages (e.g. tabs of a report), forms and menus, as well as all other aspects of the form and menu structure and operation.

Figure 3:
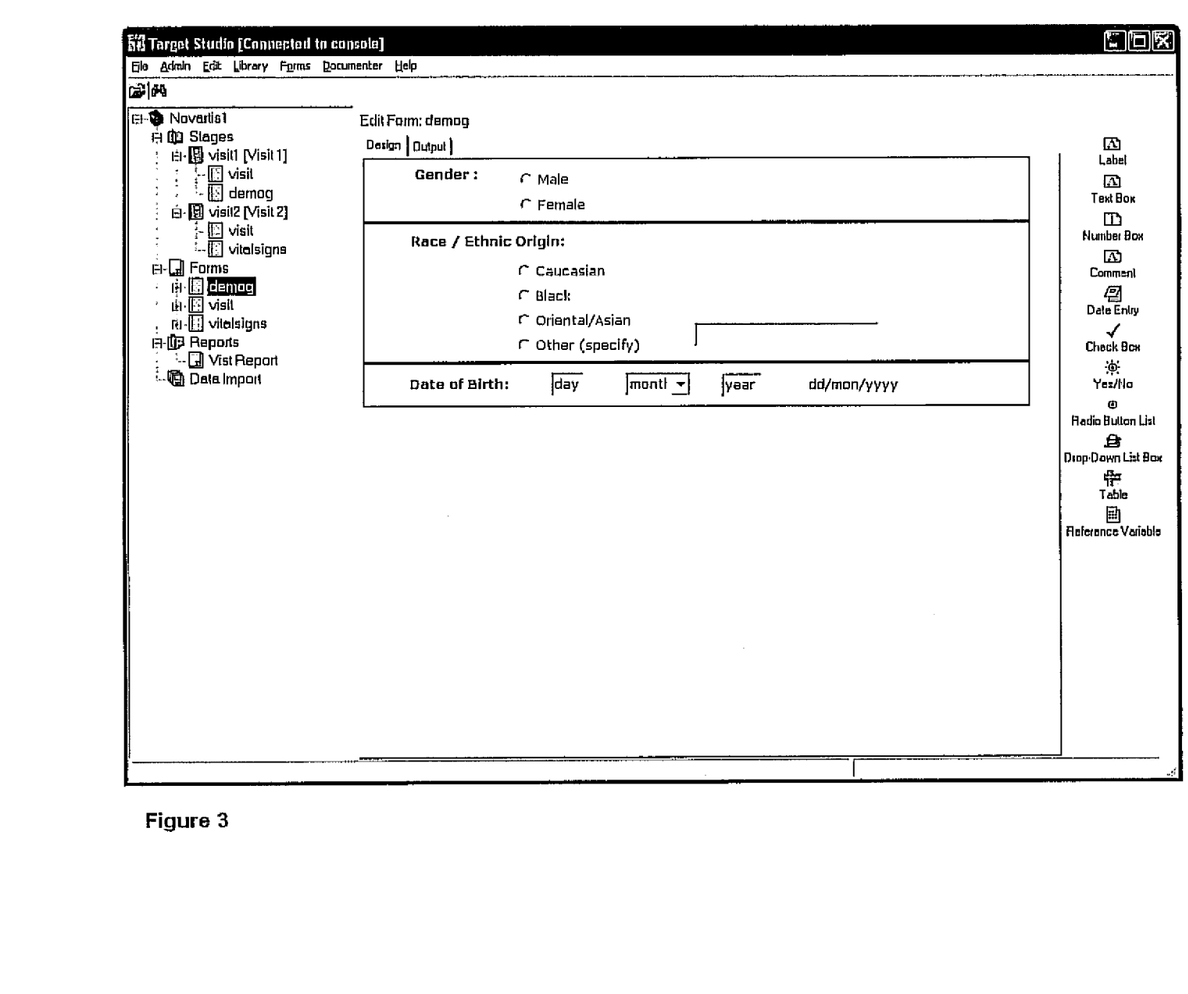
FIG. 3 represents a screenshot of a typical studio form-design screen.

FIG. 3 represents a screenshot of a typical studio form-design screen. All elements defined in the form, as well as the menu hierarchy and data input options associated with the form, e.g., pull down menu, radio buttons, or any other such input options known to those of skill in the art, are fully configurable by the user, using an intuitive, drag-and-drop, WYSIWYG ('what you see is what you get') interface.

One important aspect of the studio module is that it can be fully operated by a user with no computer programming experience. The system's graphical presentation and navigation (FIG. 3) and its intuitive proprietary scripting language (which can be easily understood and interpreted) make it ideal for users and projects of all levels of computer ability and sophistication.

The studio also empowers the user to create and design stages, forms, menus, pages, screens, and other such application elements known to those of skill in the art, for proprietary software applications (which could operate on any number of operating systems, such as Microsoft® Windows XP, Apple® OS X, Linux), as well as for web-driven (e.g., HTML. based) websites, web-pages and/or applications. A stage is a studio element that may contain menus, forms and associated logic. Stages may also contain other stages and/or sub-stages.

Figure 4:
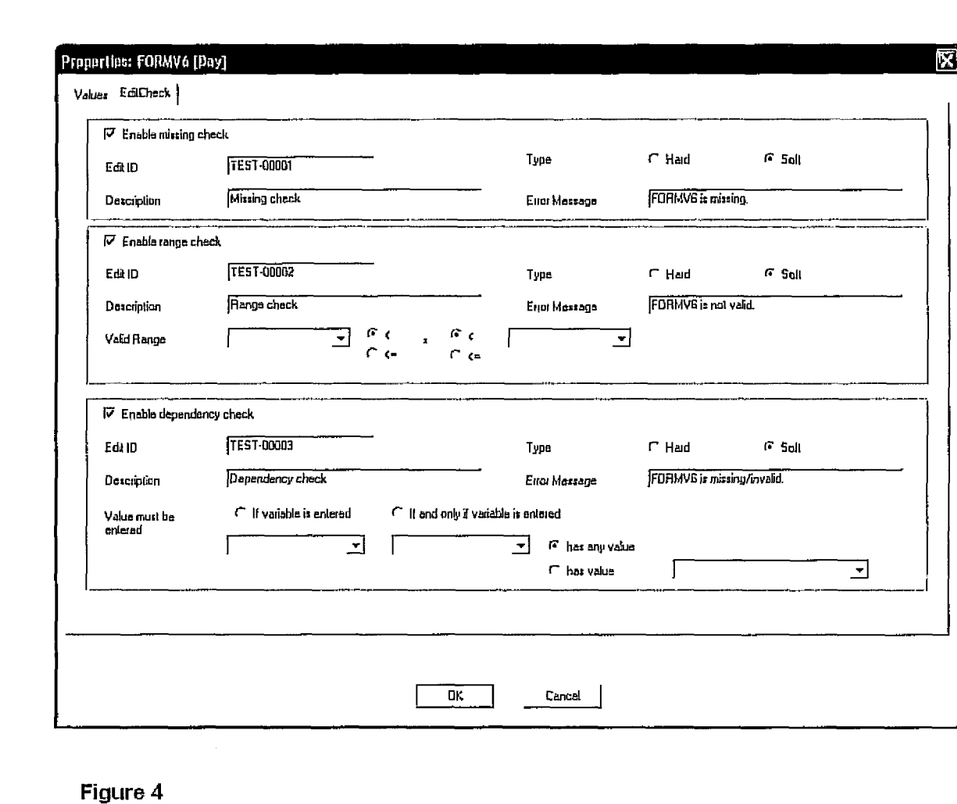
FIG. 4 represents a screenshot of a typical data validation check form.

In the context of the studio, the user is further able to define how the data received through the forms of the application and/or page will be interpreted and "mapped" by the system for data export (16). Additionally, the user can define the requirements and restrictions imposed on the data as they are inputted by the end-user, such as verifications to ensure that the data input falls within the accepted and desired range of data expected by the user. The studio module includes a validation screen that allows the user to configure data validation checks to identify missing, invalid, and/or inconsistent data from being submitted without resolution. The system can also be configured to display appropriate error message and/or comments as necessary. FIG. 4 represents a screenshot of a typical data validation check form. Two different types of validation checks can be defined: mandatory (hard) validation checks, which validate invalid or illogical data, and display a corresponding error message in a popup box. In this case, the mandatory entry cannot resume until the problem is resolved. The second type of validation check is a soft validation check that validates missing data in a field, or out of range, and displays a corresponding error message in the status area of the screen. In this case, the system retains field values until the user enters an explanation. Users can define such validation checks without programming knowledge, or use a unique scripting language developed to interact seamlessly with the other elements of the studio, as well as with the runtime module (FIG. 4). One example of a validation check would be to determine if the ages of all registrants fall within the defined age range. Such verifications can include logical operations to prevent erroneous data input (e.g., checking that a person's age falls within a reasonable range), as well as verifying the appropriateness of the data when compared with data previously stored in the system.

In using the studio module to define the presentation and functionality of the data gathering entity (either a proprietary software application, or a dynamic series of web-pages), the user is further empowered to define a scheme for importing collected data from sources external to the system (18). Within the studio, the user also has the option of importing external data sources (such as data generated from an outside company's database). The user can define the method the system should take in parsing the collected data, as well as defining the name and characteristics of the data fields and how they are presented. Furthermore, the user can store this data management scheme (consisting of a data parsing method, a data presentation method, and any other such methods known to those of skill in the art) for re-use and modification in additional contexts and projects utilizing similar external data sets. Conversely, the studio also allows the user to define a scheme by which the user can store and export collected data for use in outside sources and/or programs.

The studio also includes additional functionalities allowing the user to generate relevant documentation corresponding to the project and its associated data, as well as a preview function, which displays for the user an image of how specific components of the defined application and/or webpage will appear on the screen to an end-user. The following series of tables present examples of common data-related documentation that a user would generate using the studio module.

TABLE 1

Navigation Requirement Documentation
Project 001 NAVIGATION REQUIREMENT SPECIFICATION - DATA ENTRY

| STAGE | SUB-STAGES | FORMS | |
|---|---|---|---|
| Screening | | Demographic Info | Address |
| Visit 1 | | | |
| Visit 2 | | | |
| Visit 3 | | | |
| Project Summary | | | |

This table represents documentation typically generated by the user, reflecting the sequencing of a given project, as well as the forms associated with it.

TABLE 2

Data Validation Check Documentation
Project 001 Validation Plan

| Area | Visits | Treatment Groups | Verification Id | Description of Check | Query Text | Verification Type |
|---|---|---|---|---|---|---|
| Demographic Info | NA | All | TEST-00000 | Range check | DOB_day is not valid. | Soft |
| Demographic Info | NA | All | TEST-0001 | Missing check | DOB_day is missing. | Soft |

This table represents documentation typically generated by the user, reflecting user define data verification checks.

TABLE 3

Data Export Specification Documentation
DATA EXPORT SPECIFICATION: PROJECT 001

| FORM NAME | VARIABLE NAME | EXPORT TABLE NAME | EXPORT VARIABLE NAME | DATA TYPE | LENGTH | FORMAT | VALUE DESC |
|---|---|---|---|---|---|---|---|
| Demographic | Comment | Draphics | Comment | Text | | $8. | |
| Demographic | DOB_day | Draphics | DOBday | Number | 8. | 2.0 | |

TABLE 3-continued

Data Export Specification Documentation
DATA EXPORT SPECIFICATION: PROJECT 001

| FORM NAME | VARIABLE NAME | EXPORT TABLE NAME | EXPORT VARIABLE NAME | DATA TYPE | LENGTH | FORMAT | VALUE DESC |
|---|---|---|---|---|---|---|---|
| Demographic | DOB_label | Draphics | DOBlabel | Text | 8. | 8. | |
| Demographic | DOB_month | Draphics | DOBmonth | Text | 8. | 8. | |
| Demographic | DOB_year | Draphics | DOByear | Number | 8. | 4.0 | |
| Demographic | Label_870880707 | Draphics | L0880707 | Text | | | |

This table represents documentation generated by the user, reflecting user-defined definitions for exporting the system's collected data.

TABLE 4

Database Structure Documentation
DATABASE SPECIFICATION: PROJECT 001

| FORM | VARIABLE | VARIABLE DESC. | VALUE | VALUE DESC. |
|---|---|---|---|---|
| Demographic Info | Comment | | | |
| Demographic Info | DOB_day | Date of Birth | | |
| Demographic Info | DOB_month | Date of Birth | | |
| Demographic Info | DOB_year | Date of Birth | | |

This table represents documentation generated by the user, reflecting the given project's database structure, variables, and other such data values known to those of skill in the art.

It is important to note that all of the functionalities of the studio module are permission driven. In "connected mode", by use of the role associated with a given user credentials, including but not limited to user name and password, biometric authentication, and any other such authentication methods known to those of skill in the art, the administrator of a given project can restrict or permit the activity of any given user, or group of users, with regards to any aspect of the studio's capabilities. Furthermore, the system maintains a comprehensive historical log of each step of the project and/or application's development. This allows the administrator or other users to identify the origin of specific components of a given project and/or application, and also allows a user to revert to a previously stored version of the same application.

Generally, when the studio is operating in connected, as opposed to standalone mode, when a user saves a series of forms, menus, GUI's, and any other such elements known to those of skill in the art, as designed by the studio module, this configuration and file information is stored and managed by the console module (4).

Figure 5:
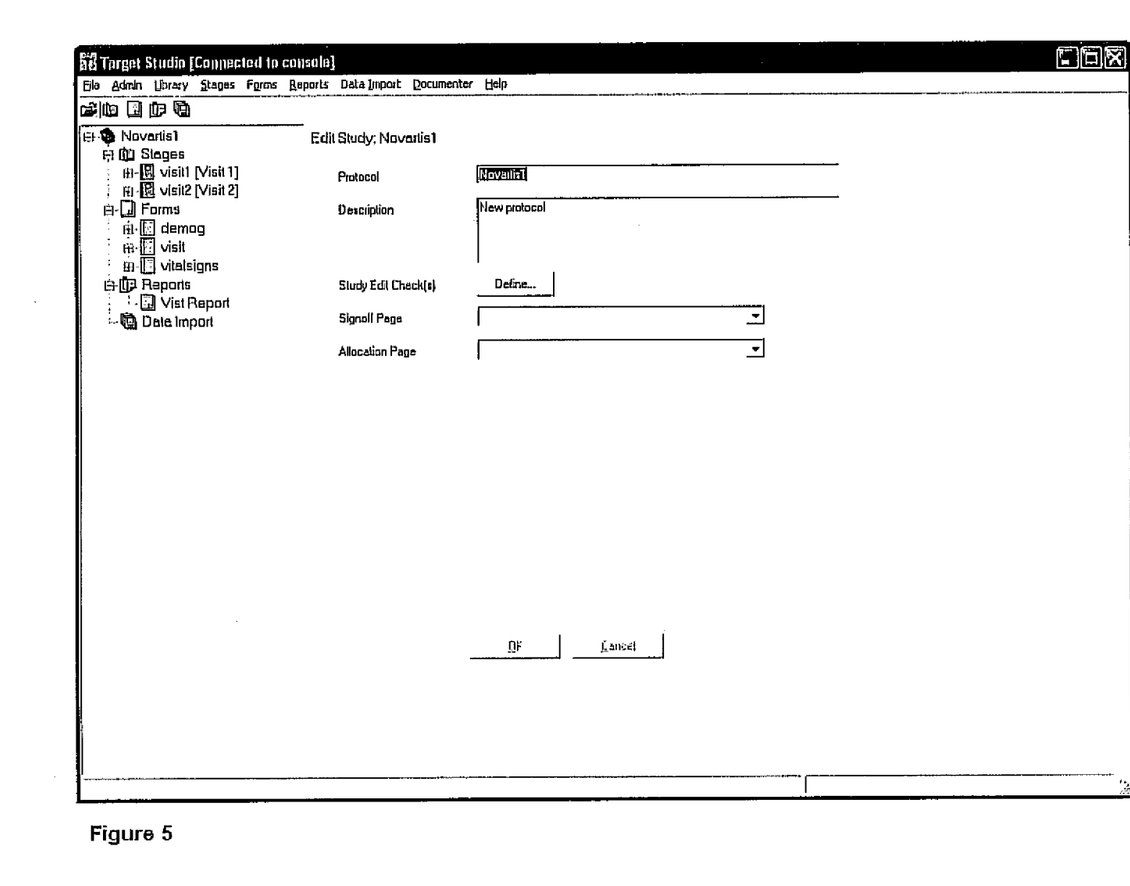
FIG. 5 represents a screenshot of the studio's main workspace.

In operation, when the user logs on to the system, the user is first presented with the studio's main workspace (FIG. 5). Initially, this screen will display menu items and toolbar icons to work on an existing project defined by console or work offline. Once this decision is made, additional menu items and toolbar icons (e.g., Admin, Library, Edit, Forms, Reports, Documenter, Data Import, Help) appear that enable users to create menus, forms and form elements, and any other such elements known to those of skill in the art.

In the preferred embodiment, the studio's main workspace is typically divided into two panes, termed the Work Area Pane and the Visual Editor Pane (FIG. 5). The work area displays the hierarchy of a project (e.g., menus, forms, reports) in a tree-like structure. Selecting an element from the work area displays a corresponding form and details in the Visual Editor. The Visual Editor is also used for visually designing screens for the runtime module, as explained below.

After determining whether the user is working online or offline, the studio creates a project directory in the Work Area Pane. Each icon represents an element of the project as follows:

Menus—create and manage different navigation options of a project (e.g., Demographics, Location). Forms can be connected to navigation options.

Forms—design and manage application screens for the runtime module.

Reports—work with management and data import reports.

Data Import—configure a dataset for importing data.

In addition to selecting menu options from the studio's menu bar, additional options can be selected by using the right-click context menu for the selected icon. The options available to the user when using the right-click function vary depending on the selected icon. Some examples include: create new menu, import menu from the library, and copy form, delete form, and any other such menu elements known to those of skill in the art.

Using the studio module, the user is able to create and manage the stages, sequenced steps within the application, of a project. Once a stage is created and added to a project, it can contain forms, variables, and even sub-stages. FIG. 3 illustrates stages and sub-stages being displayed in the work area.

After creating a main stage, the user can add sub-stages to it. For example, the Location main stage may consist of sub-stages. Once the user sets up sub-stages, they are displayed in the work area. Stages can also be modified. Once forms and variables are created, the user is then able to define form types, e.g. Standard Form, Script Form which allows for a yes/no question followed by a standard form, data import form that identifies the properties of data to be imported into the system, signoff form that captures electronic signatures, and other form types specific for a given industry.

Throughout the project creation process, the user can elect, at any time, to save the project. When saving, the studio creates a project folder, and generates configuration files that are stored in the project folder and sub folders for Forms, Reports, and Data.

When creating or editing a stage, the user can specify which forms are available for the given stage by associating forms with the selected stage.

Once a stage has been defined, it can be saved into a library (4), to allow for retrieval and reuse. The user can modify the ordering of the stages of the project. Stages can also be copied, edited, and/or deleted, allowing the user to modify existing stages, as necessary. Copying a stage will also copy any elements associated with it such as variables and forms.

The present invention also includes a system that allows the user to visually design and define the layout of forms that display data fields used at runtime. Such forms are generally used for data collection throughout the project. The user is able to enter preliminary data for a new form. After entering the Form Name, Title, and Description, the user selects the type of form desired. By default, the Form Type-Standard Form is selected.

The Visual Editor is the default view for Form Type-Standard Form. This visual design environment allows the user to design runtime forms without entering any programming code. When a new Form Type: Standard Form is created, the Visual Editor pane displays two tabs: Design and Output. The Design tab displays a visual design area and a set of screen components (e.g., radio button, drop down menu, text box, data field, and any other such elements known to those of skill in the art). To design the form layout, the user simply clicks and/or drags a screen component and drops it anywhere in the design area to reveal properties that can be modified. The Output tab generates XML code during form design. All screen components contain properties that can be modified. The user can also preview the form prior to deployment, using the preview dialog box.

The user also has the option of entering script language commands for configuring the behavior of runtime modules by selecting Form Type: Script Form. The script form allows the user to select other forms, dynamically. For example, at runtime, the user can select from a list of options which will display the selected form depending on the value entered in another form. The runtime module (6), (8), invokes and executes the script in the script form, and processes the results.

Figure 6:
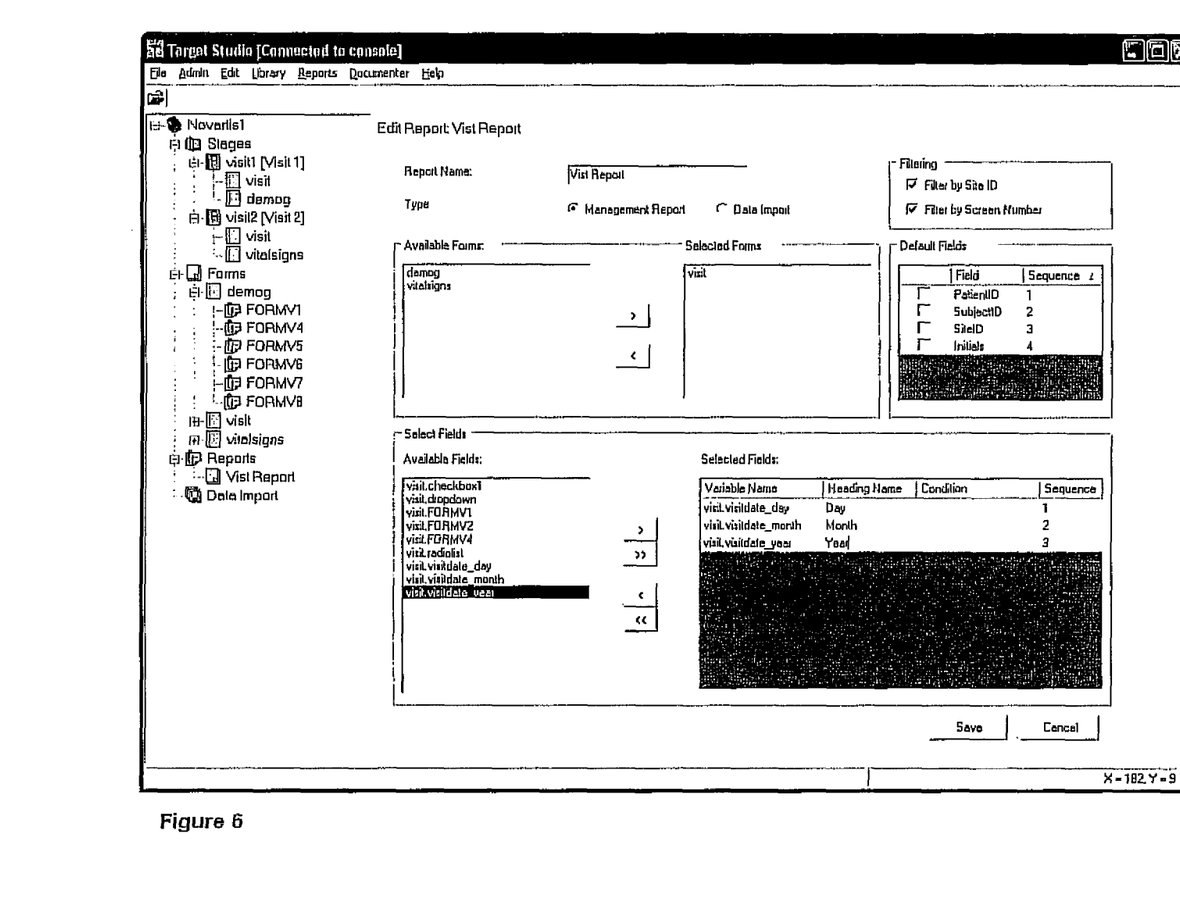
FIG. 6 represents a screenshot of a typical report configuration form.

The present invention also includes a system for managing and configuring reports that provide detailed reports and queries in a specified format (2). Such functions include: specifying report types, determining roles, selecting forms and fields, filtering report data, and specifying default fields. The user can add new reports, consisting of forms and fields, as well as a new data import report type for displaying data results. FIG. 6 represents a screenshot of a typical report configuration form.

Reports consist of properties that can be modified. The user is able to modify properties for an existing report, e.g., adding additional forms and fields. Reports can also be deleted at any time.

Console

The console module (4) manages the entire scope and lifecycle of the application and/or project and/or website, and/or any other such data-centric entity known to those of skill in the art. The console allows the user and/or administrator to define and manage all of the parameters and settings associated with creating a project, data collection and/or management and/or analysis based software application and/or website (e.g., setting permissions, defining validations, and any other such functionalities known to those of skill in the art) (12). Furthermore, the console module allows the user/administrator to define the deployment process (20), whereby a given project and/or application is actually initiated and maintained, as well as to manage the application's execution (24).

The console's main workspace enables the user to create a new project, and/or manage existing projects. When adding a new project, information is required such as the project Name and Description to be displayed by the runtime module.

The console is linked, either directly, in the case of a localized embodiment, wherein some or all components of the system are housed in one computer; or indirectly, such as via a network connection, to a database that stores and maintains records of all data input into, and processed by, the application. The console is also linked to the studio module (2), allowing the console to deploy the forms, menus, settings, as defined by the studio, to the end-user(s). The console module is also linked to the runtime module (6), (8), allowing the runtime module to render the application as defined by the console module and configured by the studio module.

Figure 7:
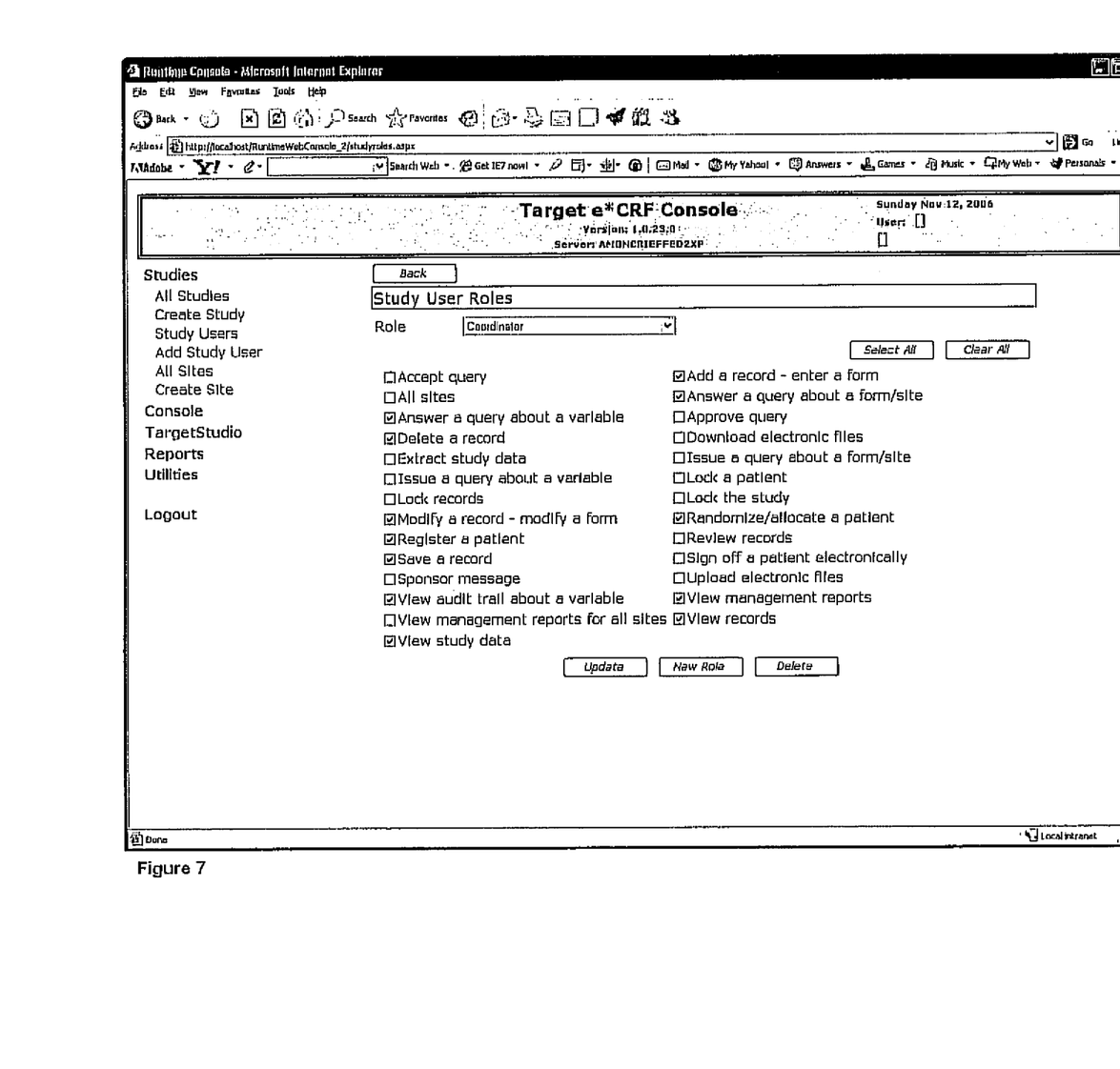
FIG. 7 represents a screenshot of a typical user role configuration screen.

The present invention also includes a system console for creating, defining, and managing the roles for various participants associated with a project and/or application. A user with appropriate permissions in the console module can create new roles for a given project and/or application to determine responsibilities (permissions) for the new role, and assign the new role (by default) to application elements. Permissions determine how a new role can interact with various application elements such as a menu or form. Project requirements also govern how a role interacts with an application. FIG. 7 represents a screenshot of a typical user role configuration screen.

The console also enables the user to customize roles according to project requirements. Once the user has created a role, the role can be assigned to menus, forms, reports, and any other such data elements known to those of skill in the art. Roles can also be deleted by the user if they are no longer needed within the project.

A console user with appropriate permissions in the console module can make changes to a project. For example, these changes may include: specifying the number formats that will be used to define ID numbers, and location number.

Figure 8:
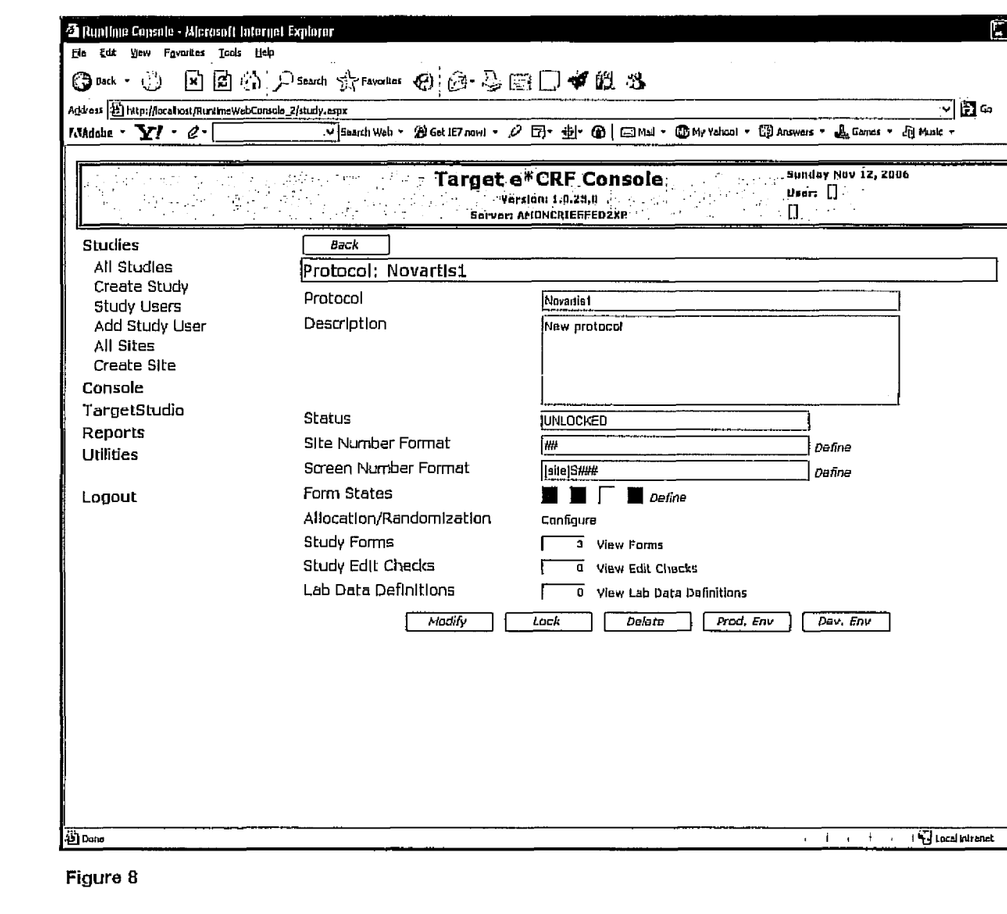
FIG. 8 represents a screenshot of a typical user configuration screen for defining the settings associated with various data entry and application related states.

The system also gives the user the ability to assign a color scheme to differentiate the various data entry states of the data collecting application. Examples of such states include: data not entered, data entered, data reviewed, and data locked. Each application state determines the type of review process used to validate data. FIG. 8 represents a screenshot of a typical user configuration screen, allowing the user to define the settings associated with various data entry and application-related states.

After the configuration of a project is completed, it is ready for deployment. The Deploy feature (20) enables the user to prepare the project for runtime. If any deploy errors are encountered, they are displayed, allowing the user to correct them. Once corrected, the user can deploy the project again. Console also includes administrative settings that are used to specify the location for deployment of a project and corresponding elements (e.g. deployment can occur to either a development website (6) or a production website (8)).

The console module also provides change management features. As changes are made in studio, which are then applied to previously deployed applications, console gives users the option to re-execute previously defined validation checks in "batch" mode to ensure data integrity. The result of the execution of a "batch" validation check appears and is managed in the runtime module.

The present invention also includes an integrated library function that is managed by console (4). The library enables studio users to save and retrieve project elements such as stages, forms, and variables as well as entire projects. Project elements from other projects and applications can also be imported, exported, or reconfigured as new elements for a new project. Library is only available when the user is connected with console. Console provides roles and responsibilities for the library user. These roles and responsibilities control user interaction with the library, and library contents. Project elements such as forms may be standardized within the library, e.g. standard regulatory/legal forms.

Runtime

Figure 9:
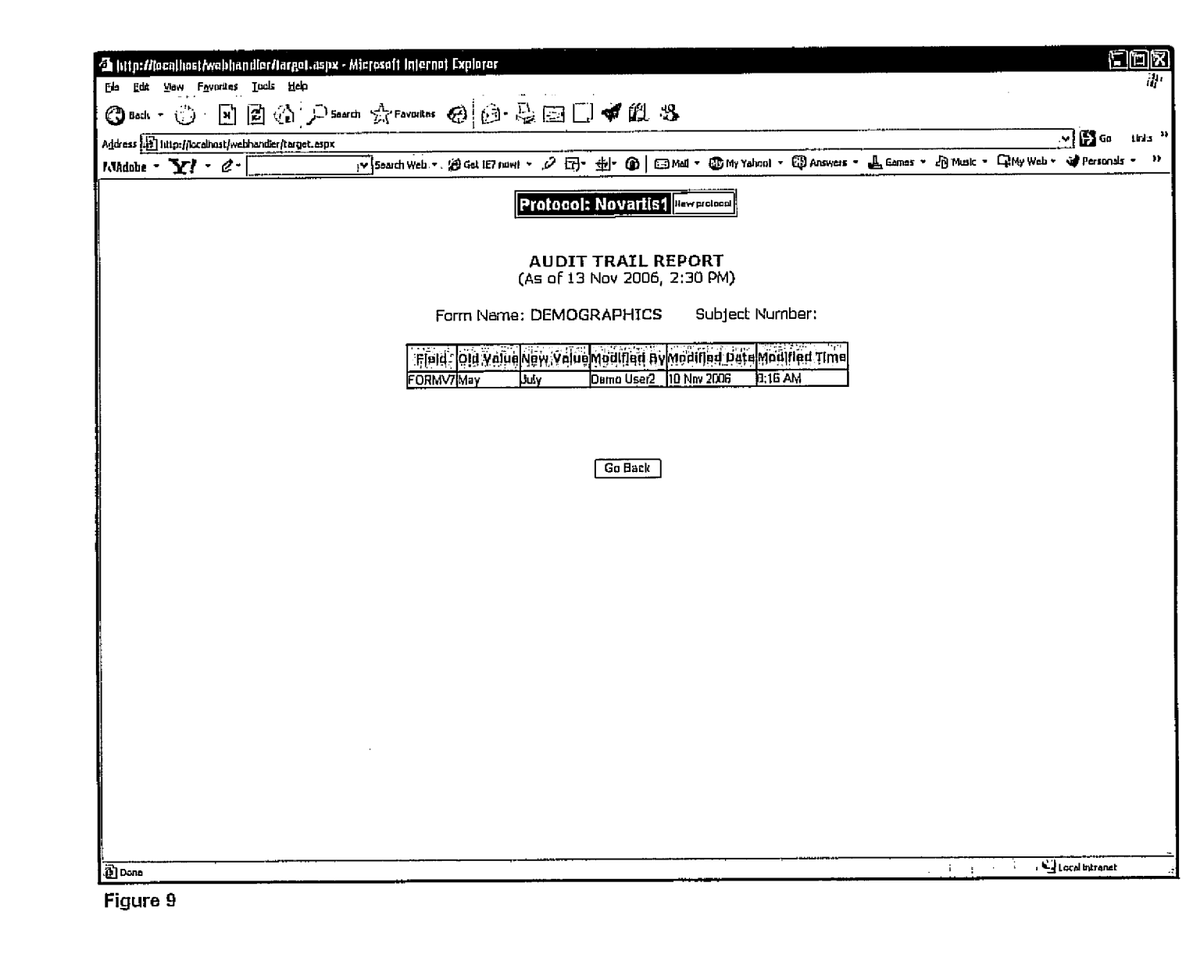
FIG. 9 represents a screenshot of a typical audit trail report, as generated based on input from runtime.

The system's runtime module (6), (8), generates the dynamic embodiment of the application/project/website (22)

as defined by the studio module and managed by the console module. The runtime module is linked (as described above) to the system's console. Runtime renders the defined form, page, and any other such elements known to those of skill in the art, and presents it to the user for the user's interaction and input. All inputs made within the runtime module are tracked and stored as an audit trail, to allow the application's administrator to identify, correct, restrict, or approve of specific actions initiated by identifiable users. FIG. 9 represents a screenshot of a typical audit trail report, as generated based on input from runtime. Furthermore, in runtime the administrator can define permissions and restrictions associated with a given user, form, project, application, location, and any other such elements known to those of skill in the art.

The system can be configured by the user to operate two (or more) runtime modules, if desired. Typically, as in the preferred embodiment, the user will choose two parallel runtime installations, termed "Development Runtime" (6) and "Production Runtime" (8). In such a configuration, the development environment would allow an application to be deployed to a testing or validation setting, where select users can interact and test the runtime module. Once the application has been tested and found to operate properly, the user can deploy it to the production setting (8), where the application becomes available for use by its target audience.

At the completion of any use or iteration of the system, the console stores and archives the data input, as well as all changes occurring in the system, for future review (26).

The invention has been described in an illustrative manner, and it is to be understood that the terminology used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An integrated electronic application design, management, and deployment system, said system comprising:
    a design software program encoded on a computer readable medium for intuitively creating, defining and displaying navigational and data-related parameters, and navigational and data-related elements of an electronic application, wherein said navigational parameters include sequences between menus, forms, and reports, and said data-related elements include electronic forms, menus, data types, and sequencing and operational configurations;
    a management software program encoded on the computer readable medium for controlling an overall functionality and operation of the system and for controlling an operation of an integrated electronic data application management system;
    a deployment software program encoded on the computer readable medium for initiating and running an electronic application that generates a dynamic embodiment of the electronic application; and
    an archiving software program encoded on the computer readable medium for storing and referencing all data associated with the electronic application, wherein the system is used when large amounts of the data are collected in distant locations.

2. The system of claim 1, wherein said design software program is defined as an interface and tool for defining data-related elements.

3. The system of claim 1, wherein said design software program is further defined as a graphically-oriented design tool for defining electronic application elements.

4. The system of claim 3, wherein said electronic application elements include screens, forms, and menus.

5. The system of claim 1, wherein said design software program includes a data definition tool, for customizing parameters associated with electronic application and system data.

6. The system of claim 5, wherein said parameters include data presentation, data interpretation, data validation, and data association.

7. The system of claim 1, wherein said design software program is operable in multiple contexts and settings.

8. The system of claim 7, wherein said contexts and settings include independent/standalone operation, and integrated/networked operation.

9. The system of claim 1, wherein said design software program includes an administrative tool for defining operational access settings and permissions for multiple users and/or user groups of the system.

10. The system of claim 1, wherein said design software program further includes a scripting tool for defining navigational and data-related parameters and settings.

11. The system of claim 1, wherein said design software program further includes a reporting tool for generating detailed reports and queries based on the data and navigational aspects of an electronic application.

12. The system of claim 1, wherein said design software program generates data-related documentation.

13. The system of claim 1, wherein said management software program is electronically linked to a navigation design program, and an electronic application delivery program.

14. The system of claim 1, wherein said management software program includes a tool for defining display and interface related aspects of an electronic application.

15. The system of claim 1, wherein said management software program further includes a library tool for storing electronic application related data and files for reuse.

16. The system of claim 15, wherein said library tool includes a configuration program for defining the operational parameters and user permissions/restrictions associated with said library tool.

17. The system of claim 1, wherein said management software program is electronically linked to an electronic database for storing electronic application-related data.

18. The system of claim 1, wherein said management software program is further defined as a software program for defining operational settings, restrictions, and limitations of an electronic application, based on any number of factors or criteria.

19. The system of claim 18, wherein said factors or criteria include user identity, user role, user location, and time/date.

20. The system of claim 1, wherein said deployment software program includes a tool for executing related and associated applications together in conjunction with a primary electronic application.

21. The system of claim 1, wherein said deployment software program further includes a tracking system for maintaining and storing audit-related data associated with an electronic application and its operation.

22. The system of claim 1, wherein said deployment software program includes a tool for configuring multiple instances of the electronic application.

23. The system of claim 22, wherein said instances include development setting and production settings.

24. The system of claim 1, wherein said archiving software program is electronically linked to a data storage medium.

25. The system of claim 1, wherein said archiving software program is configurable to store multiple data versions and iterations associated with a singular electronic application.

26. An integrated application design, management, and deployment method, comprising steps of:
- defining and displaying the navigational and data-related parameters of an electronic application by designing sequences between menus, forms, and reports;
- controlling an overall functionality and operation of the steps, and controlling an operation of an integrated electronic data application of the steps;
- initiating and running an electronic application that generates a dynamic embodiment of the electronic application; and
- storing and referencing all data associated with the electronic application, wherein large amounts of the data are collected in distant locations, said step of defining and displaying the navigational and data-related parameters of with the electronic application further including the step of creating and designing navigational and data-related elements include electronic forms, menus, data types, and sequencing and operational configurations of the electronic application.

* * * * *